(12) United States Patent
Egnell

(10) Patent No.: US 6,525,852 B1
(45) Date of Patent: Feb. 25, 2003

(54) ADD AND DROP NODE FOR AN OPTICAL WDM NETWORK HAVING TRAFFIC ONLY BETWEEN ADJACENT NODES

(75) Inventor: Lars Egnell, Saltsjöbaden (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/328,383

(22) Filed: Jun. 9, 1999

(30) Foreign Application Priority Data

Jun. 10, 1998 (SE) .............................................. 9802071

(51) Int. Cl.$^7$ ................................................ H04J 14/02
(52) U.S. Cl. ........................................ 359/127; 359/128
(58) Field of Search ................................ 359/119, 127, 359/130, 128

(56) References Cited

U.S. PATENT DOCUMENTS 5,179,548 A * 1/1993 Sandesara .................... 370/222
5,537,393 A * 7/1996 Shioda et al. ............... 359/119
6,023,359 A * 2/2000 Asahi .......................... 359/110
6,075,629 A * 6/2000 Al-Salameh et al. ........ 359/110

* cited by examiner

Primary Examiner—Leslie Pascal
(74) Attorney, Agent, or Firm—Nixon & Vanderhye, PC

(57) ABSTRACT

An optical fiber network of WDM type comprises two fibers which carry light signals propagating in opposite direction and which are arranged in a ring configuration. In the ring, one standby link between two neighboring nodes is used if another link fails. An add and drop node, used in the network only for traffic between neighboring nodes, has band blocking filters connected in respective fibers between a drop coupler and an add coupler. A drop coupler takes out equal shares of the light power to be received through simple switches and bandpass filters in receivers. An add coupler adds new wavelength channels produced in transmitters in the node through multiplexers and simple switches. The switches are used for receiving and transmitting on the wavelength channels in correct directions depending on the location of the inactive link. Thus, the positions of two of the switches have to be changed when the inactive link is one of the two links directly connected to the node. Such a node has a minimun of in-line components, and particulary, a minimum of in-line filtering components.

5 Claims, 5 Drawing Sheets

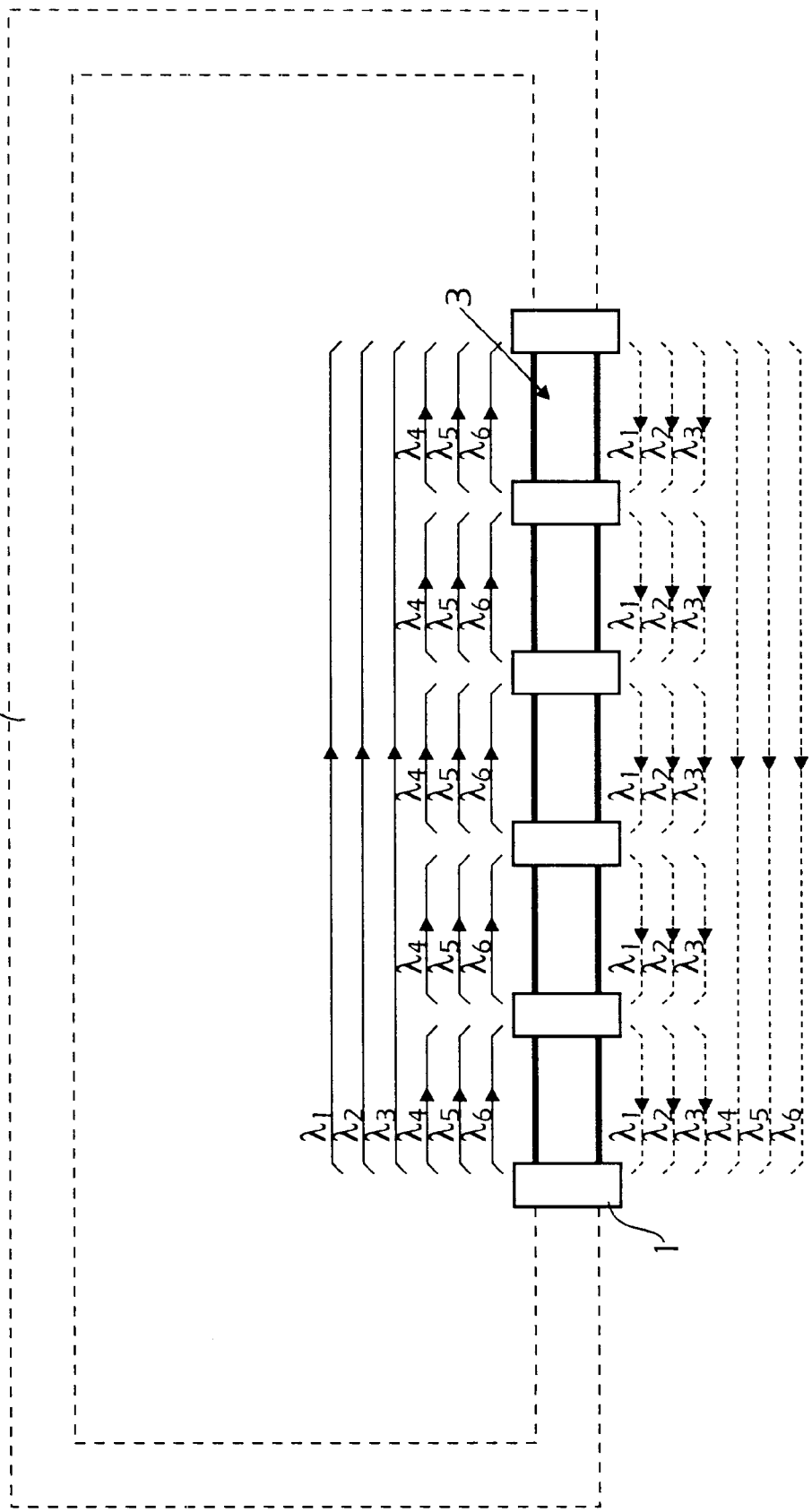

ADD AND DROP NODE FOR AN OPTICAL WDM NETWORK HAVING TRAFFIC ONLY BETWEEN ADJACENT NODES

The invention relates to an add and drop node for an optical fiber network using wavelength division multiplexing (WDM).

BACKGROUND

Optical multi-channel systems employing wavelength multiplexing are used both in new networks and in order to enhance the transmission capability of existing optical fiber networks. Thus, information channels which previously had to be transmitted on a plurality of separate fiber pairs are forwarded on a single fiber pair in WDM networks. Using optical wavelength division multiplexed channels means that a plurality of serial information signals, i.e. a plurality of serial binary signals, are transmitted on the same optical fiber by modulating such a serial signal on a light signal, also called carrier, having a definite wavelength and then combining the modulated light signals in an optical coupler or optical multiplexer to a composite light signal on the considered optical fiber. The signal primarily modulated on a monochromatic light signal or carrier together with the carrier can be called a channel or traffic channel.

Self-healing optical fiber networks having a ring configuration are disclosed in U.S. Pat. No. 5,442,623, but they are not particularly adapted to WDM-signalling. A similar network designed for WDM-traffic is disclosed in the International patent application PCT/SE98100136. The networks described in these documents use an extra protecting fiber pair between each pair of nodes.

Optical wavelength multiplexing can generally be used in different optical fiber network configurations or architectures having e.g. only a single fiber pair between a pair of nodes. Such an architecture is the FlexBus™ concept as described in B. S. Johansson et al., "Flexible bus: A self-restoring optical ADM ring architecture", Electronics Letters, 5th Dec. 1996, Vol. 32, No. 25, and U.S. patent application 08/421,734, this architecture comprising a ring configuration of optical links connecting a plurality of nodes. The FlexBus™ concept has emanated from the need for protecting ring networks against fiber cuts and optical amplifier failures, and to solve the problem, often associated with ring network architectures, of circulating signals and noise. In the FlexBus™ architecture one section of the fiber ring is always made passive or inactive by means of optical switches or amplifiers. This intentionally introduced break effectively eliminates all problems associated with circulating signals and hence allows that less circuit components can be used and circuit elements having lower performance can be used, while still retaining the shortest longest path possible. In the case of a real failure of a link, that link which previously has been intentionally made inactive is made active and the failed link now becomes the inactive link, what can be described by having the inactive link moved from its former position to the failed section. This procedure is called that "the bus flexes", and thereby the traffic is restored.

In the FlexBus™ channel blocking or selection filters placed in the lines are not needed, which alleviates the problems associated with concatenated filtering. The signal from one transmitter can be sent in both directions simultaneously without causing interference, and the same wavelength can be used in both directions, thus allowing the same number of bidirectional connections to be set up as the number of wavelengths that are used in the network.

With the maturing of filtering and switching technology it would, however, be beneficial to be able to reuse wavelengths more than once in order to be able to set up more connections and thus increase network capacity for the limited number of wave-lengths that are feasible in a network with regard to available optical amplifier gain-bandwidth, realistic filter bandwidths and frequency stability of filters and light sources. Thus another implementation of a node architecture, based on the FlexBus™ but including a plurality of blocking filters and switches connected in-line, i.e. in the direct path of a fiber of the network or bus through the node, was invented and is disclosed in the published International patent application WO 96/31025 and is called the "Rearrangeable FlexBus™". That implementation is capable of a very efficient use of the wavelengths. In the published International patent application WO 96/24998 an algorithm scheme for wavelength allocation in Rearrangeable FlexBus™ networks is disclosed.

The general architecture of the Rearrangeable FlexBus™, see also the published International patent application WO 96/24998 and the U.S. patent application "An optical WDM network having an efficient use of wavelengths and a node therefor", filed at the same time as the present application, is very efficient in using the available wavelengths and also very flexible as to the number of connections which can be set up in the network. Partly depending on the actual way in which networks often have been implemented, partly because of the requirement for truly adjacent traffic in networks, it appears to often exist an interest of finding good network solutions for adjacent traffic demands, i.e. for traffic between neighboring stations or nodes. For a network having only such a kind of traffic, the channel by channel configurability is not necessarily required, and it is thus of interest to search for a simpler design of an add and drop node for this type of traffic pattern compared to that disclosed in the above-cited, simultaneously filed U.S. patent application.

SUMMARY

It is an object of the invention to provide an add and drop node for a network of the kind Rearrangeable FlexBus™ as described above and for traffic only between neighboring nodes, the node having a minimum of in-line components and enhancing the reliability of the network but still having the good properties of the FlexBus™ and allowing an efficient use of wavelengths.

The problem to be solved by the invention is how to achieve, for a network of the kind Rearrangeable FlexBus™ having traffic between only neighboring nodes, a node construction operating substantially as the nodes of that bus allowing an efficient wavelength allocation in the network and allowing the network and the nodes to operate in a reliable way.

Thus generally, an add/drop node is designed to be connected in an optical fiber WDM network and for communication only with neighbouring nodes. The network has a ring configuration of two fibers carrying light signals in opposite directions and comprises links connecting neighbouring nodes. For protection purposes, the network always has one link which is inactive and carries no light signals and the network has switching facilities allowing the inactive link to be made active and another link to be made the inactive link. The network carries light signals containing useful information in a plurality of separate wavelength bands. In the conventional way the node has drop couplers and add couplers for each direction for taking out a share of light signals at the node and adding light signals in the node respectively and receivers for receiving light signals in wavelength bands in the node and transmitters for transmitting light signals in wavelength bands from the node into the network. A band blocking filter is connected between a drop coupler and an add coupler which are used for light signals in one direction for blocking in the same direction all wavelengths which are received in the node from that direction. A switch is connected to a receiver and the drop couplers for allowing the receiver to receive from either one of the two opposite directions and/or a switch is connected to a transmitter and the add couplers for allowing the transmitter to transmit in either one of the opposite directions. Preferably, two separate switches are provided, one connected for receiving and one for transmitting.

The receivers can be divided in two groups of west port receivers and east port receivers. One switch is then preferably connected to all the receivers of one group for allowing all the receivers of this group simultaneously receive from either one of the opposite directions. Then an optical demultiplexer can be connected between the switch and the group of receivers.

The transmitters can also be divided in two groups of west port transmitters and east port transmitters. One switch can then be connected to all the transmitters of one group for allowing all the transmitters of this group simultaneously transmit in either one of the opposite directions. An optical multiplexer is then advantageously connected between the switch and the group of transmitters.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
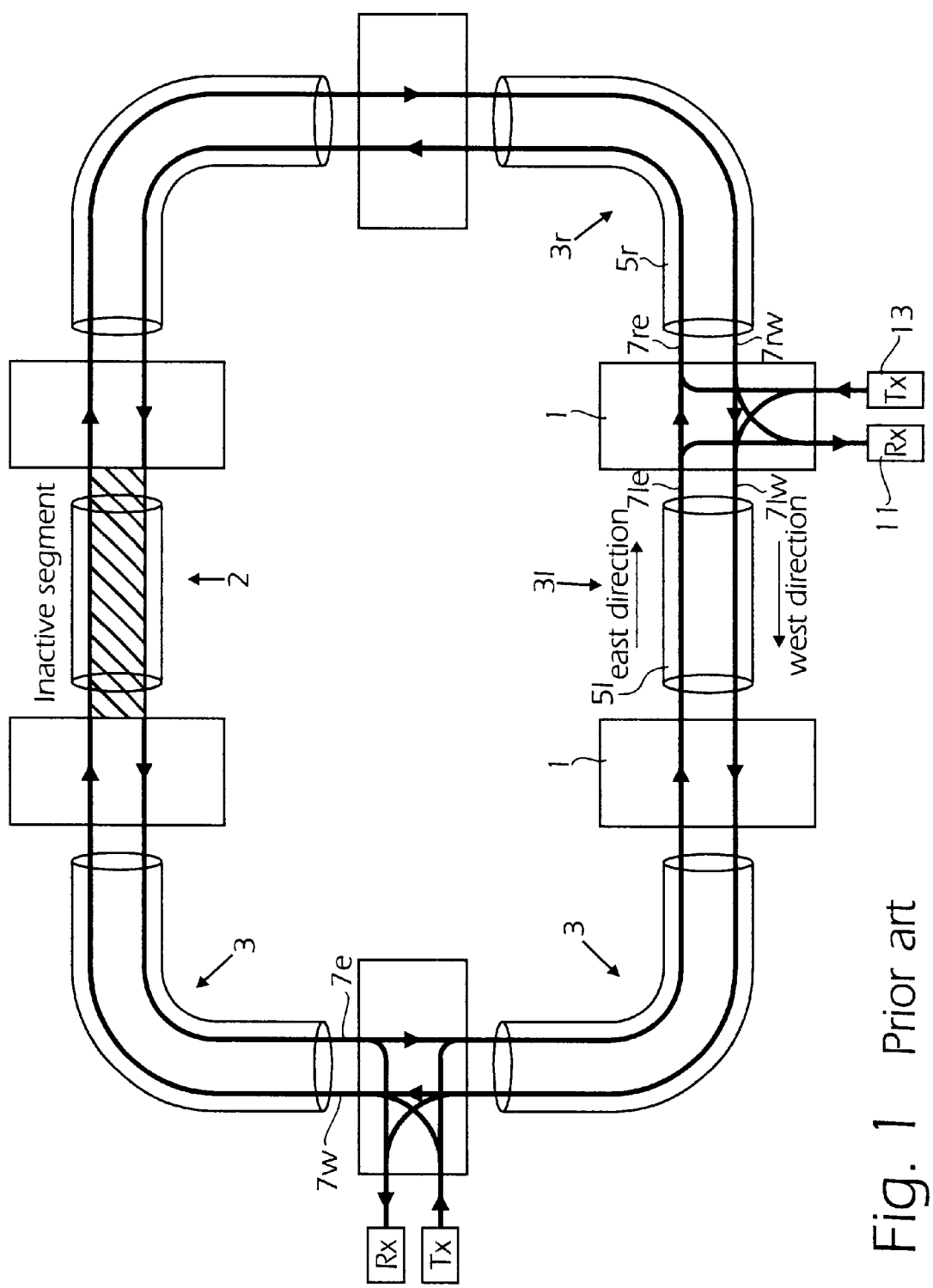
FIG. 1 is a general schematic view of an optical fiber network of WDM type using the flexible bus architecture.

A network using the basic flexible bus structure for WDM communication on optical fibers is illustrated in FIG. 1. A plurality of optical, add and drop nodes 1 are connected to each other by links 3 to form a network or bus comprising a physical ring structure having as basic elements a pair of optical fibers 7e, 7w connected to form two parallel fiber rings. Each fiber ring carries light propagating in a definite direction, the propagation directions of the two rings being opposite to each other. Thus, in one of the fiber rings light always propagates in the counter-clockwise direction, in the embodiment of FIG. 1 the inner ring 7e, this direction being called the east direction hereinafter. In the other one 7w of the rings of the pair of fiber rings light always propagates in the opposite direction, i.e. in the clockwise direction, as seen in FIG. 1, this direction being called the west direction. A node 1 in the bus structure is thus physically connected only to two neighbouring nodes, a left node and a right node. The connections of a considered node 1 thus include a left physical link 3l comprising a west line cable 5l and a right physical link 3r comprising an east line cable 5r, the other end of each link 3l, 3r being connected to the neighbouring left and right node respectively. Each piece 5l, 5r of line cables comprises a pair of optical fibers 7le, 7lw and 7re, 7rw respectively, where in one 7le, 7re of the fibers of a fiber pair in a link 3l, 3r light always propagates in one direction, as in the east direction as seen in FIG. 1, and in the other one 7lw, 7rw of the fibers of the fiber pair in a link light always propagates in the opposite direction, in the clock wise or west direction, as seen in FIG. 1. Furthermore, a node 1 is connected to or contains receivers 11 and transmitters 13 for converting optical signals to electrical signals and vice versa, the electrical signals being transferred or received respectively from other devices, links or networks, not shown.

One of the links 3 of the ring structure is always deactivated, see the link 2 in FIG. 1, so that at least no light carrying the useful information to be transferred in the network can pass therethrough, in neither direction. This prevents that such light signals and ASE noise can circulate along the ring structure in several turns, ASE noise being amplified spontaneous emission produced in in-line optical amplifiers which are usually included in the nodes 1. When there is a failure in a link between neighbouring nodes, the network can be reconfigured so that this link will then be the deactivated one whereas the previously deactivated link (2) is now activated and operates like the other active links (3) in the ring structure passing signals in the two opposite directions.

Figure 2:
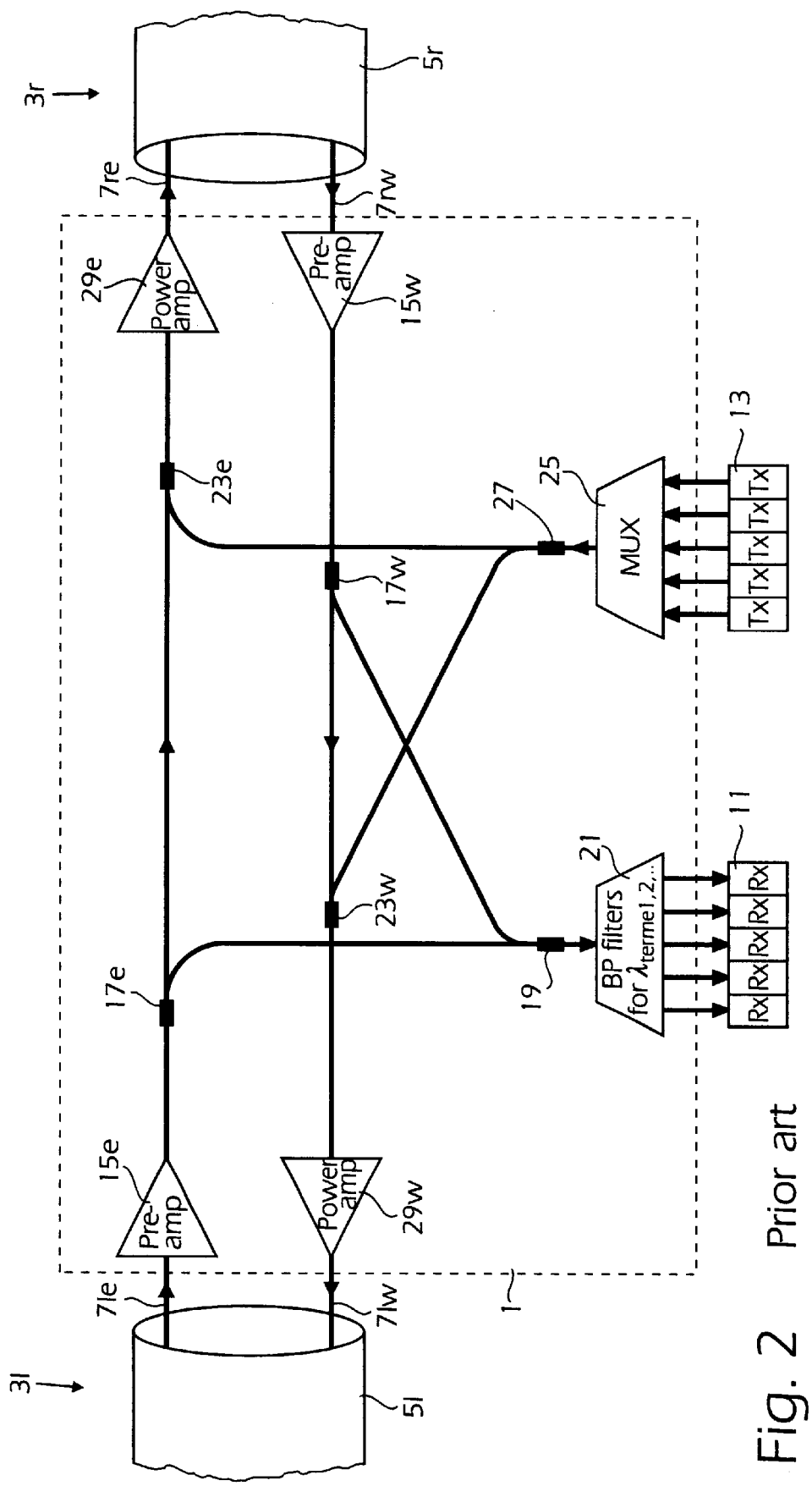
FIG. 2 is a block diagram of a prior art add and drop node of a simple configuration for the network of FIG. 1.

A basic structure of a node 1 in the basic flexible bus structure of FIG. 1 is shown in the block diagram of FIG. 2. The optical WDM traffic comprising a plurality of WDM channels having definite, separate wavelengths, each channel occupying a wavelength band around the wavelength of the channel, enters the node from the left or in the east direction and from the right or in the west direction on the fibers 7leand 7rw respectively. The incoming signals can be amplified in optional optical preamplifiers 15e, 15w respectively in which the light signals are amplified. The incoming light is then split in drop couplers 17e, 17w. These couplers are optical power splitters that feed a portion of the total power of the light propagating in one direction in the bus, through an optical combining coupler 19, adding the deflected power portions from each direction to each other, to a bank 21 of filters, which can also be called an optical demultiplexer, having one or more bandpass filters for wavelengths used in the transmission in the network. Thus the filter bank 21 filters out channels, each channel carrying information in a definite wavelength band. The filtered-out light signals are then forwarded to opto-electrical receivers 11, one optical receiver being arranged for each received channel.

The remaining part of the light power split in the drop couplers 17e, 17w is forwarded through the node 1 and is in add couplers 23e, 23w mixed with new traffic to be added in the node. This new traffic is obtained from electro-optical transmitters 13, that each one transmits optical signals of a wavelength band or a channel different from that of the other transmitters. The output signals of the transmitters 13 are added to each other in an optical combining coupler or optical multiplexer 25, the resulting combined signal then being split in a splitting coupler 27 in two portions having equal power, one of the two portions being transmitted to one of the add couplers 23e, 23w and the other portion being transmitted the other one of the add couplers. The light signals obtained from the add couplers 23e, 23w for each direction are fed to the fibers 7re, 7lw, which are contained in the links 3r, 3l connected to the node and carrying light going out from the node, through optional optical power amplifiers 29e, 29w.

In the node design as illustrated in FIG. 2 the lack of in-line blocking filters and inline switches should be observed and in particular that light propagates through or passes the node in a substantially unaffected or uninterrupted way. Furthermore, the transmitters 13 are sending in and the receivers 11 are listening to both traffic directions simultaneously. The left side or the right side amplifiers 15e, 29w or 15w, 29e respectively can be used to deactivate the respective links or segments 3l, 3r connecting the node to the two neighbouring nodes. This is made in the case where this link is to be the deactivated one, such as in the case of a failure of this link. Such a failure can be caused e.g. by one of the fibers of the pair of the link being broken or by one of the optical amplifiers connected to this link being faulty.

The bus structure and node design according to FIGS. 1 and 2 are described in the above cited article by B. S. Johansson et al. and in the cited U.S. patent application Ser. No. 08/421,734. However, this structure only allows that a considered wavelength or channel is used once in the network in each direction, such as for communicating between two nodes. A node architecture allowing a reuse of wavelengths, i.e that a channel or wavelength is used more than once for transferring information in one direction, is disclosed in the cited International patent application WO 96/31025 resulting in a more efficient use of available wavelengths. However, this prior node design has a multitude of demultiplexers and switches connected in-line, i.e. in the direct path of a fiber of the network or bus through the node. Still, this prior node allows a very efficient use of the wavelength range or equivalently a very efficient use of available channels.

Figure 5B:
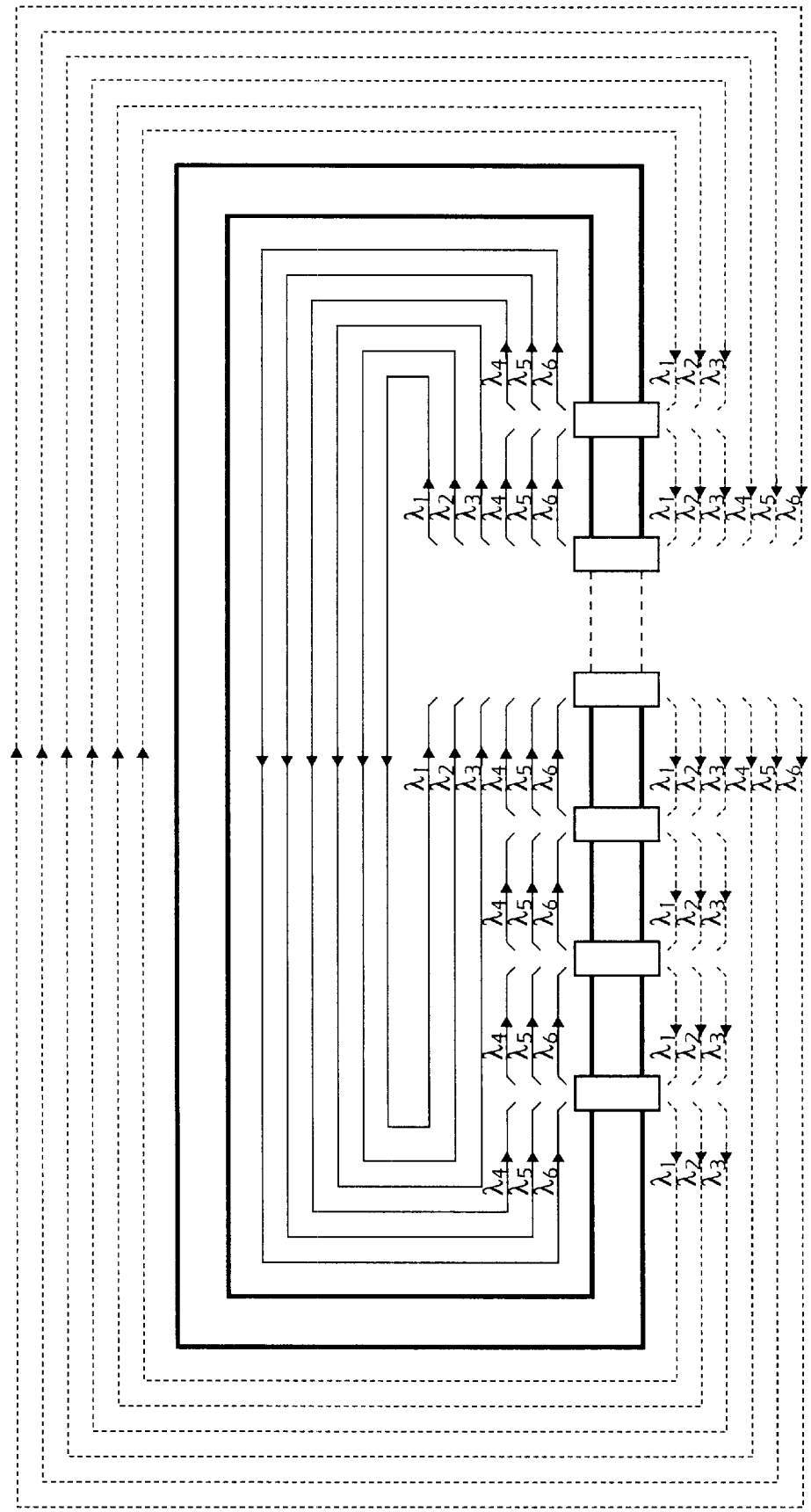

For the strictly adjacent traffic situation, all wavelengths can be reused between all node pairs, see the schematic picture of FIG. 5a. In this ring network traffic only occurs between neighbouring nodes, the term neighbouring being taken generally with respect to the ring configuration. Thus, all pairs of neighbouring nodes having an active link or the inactive link between them communicate with each other. Here a network having six nodes is shown, using six different wavelength channels having wavelengths $\lambda_1$, $\lambda_2$, ... $\lambda_6$. The wavelengths $\lambda_4$, $\lambda_5$, $\lambda_6$ are for each node except the east-most one used for transmitting on the fiber 7re for east going traffic to the most adjacent node on the east side of the node, these same wavelengths being used by the east-most node for transmitting to the west-most node using the fiber 7lw for west going light signals. In the similar way, the wavelengths $\lambda_1$, $\lambda_2$, $\lambda_3$ are for each node except the west-most one used for transmitting on the fiber 7lw for west going traffic to the most adjacent node on the west side of the node, these same wavelengths being used by the west-most node for transmitting to the east-most node using the fiber 7re for east going light signals. In FIG. 5b the same network is illustrated after a relocation of the inactive link 2, in which the wavelength allocation is also visible and from which it can be deducted how the transmission and reception of wavelength channels must be changed.

It is then obtained, as can easily be seen from FIG. 5a, that for $N_\lambda$ wavelengths, where $N_\lambda$ is assumed to be an even number, $N_\lambda/2$ connections between each adjacent node pair can be set up, which implies $N \times N_\lambda/2$ connections for a network having N nodes.

Figures 3, 4:
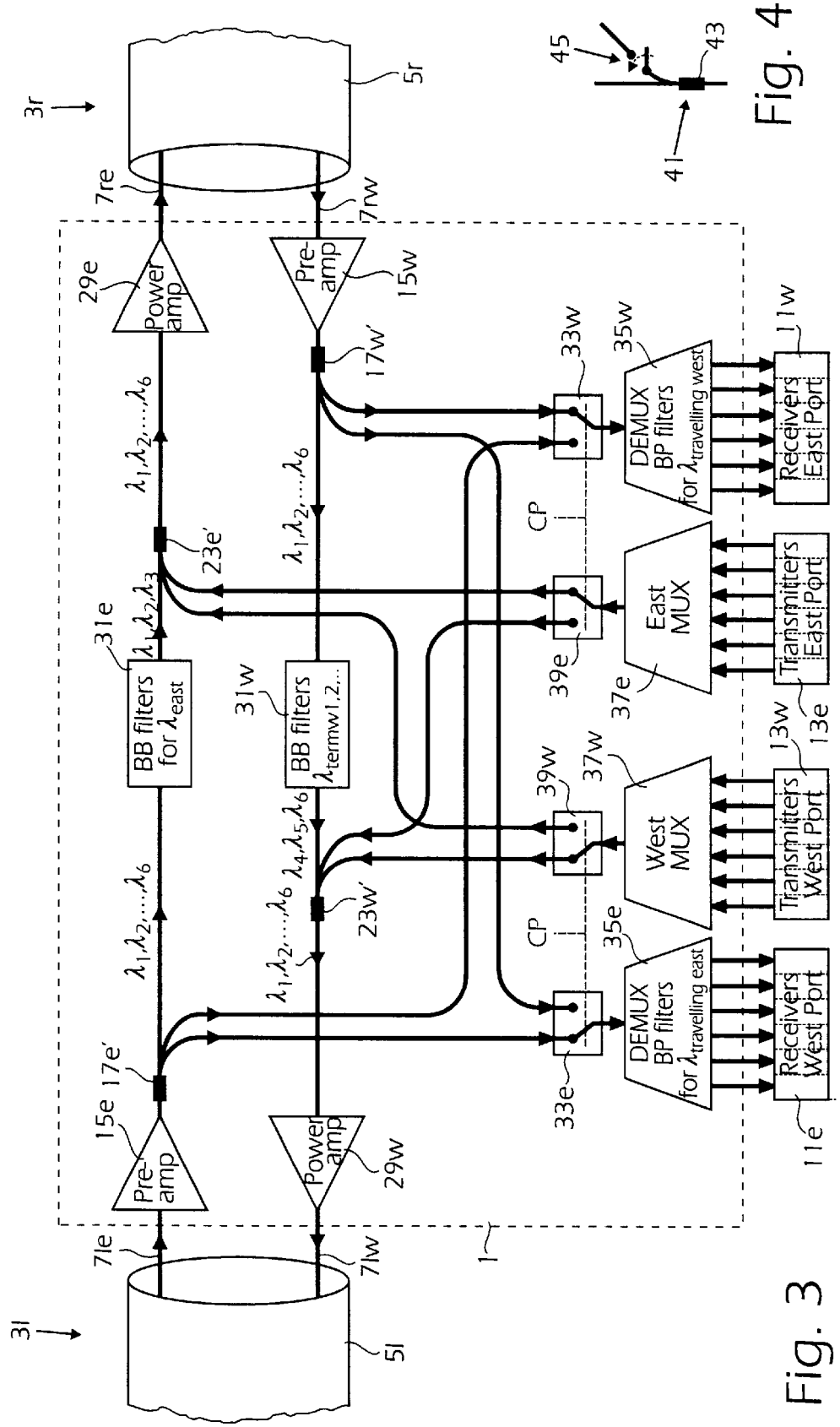
FIG. 3 is a block diagram of an add and drop node designed for communication between neighbouring nodes in the network of FIG. 2.
FIG. 4 is a picture showing an alternative design of a switching element used in the node of FIG. 3, and FIGS. 5a and 5b are graphs illustrating the assignment of wavelengths in a network of the kind illustrated in FIG. 1 having nodes according to FIG. 3 for two respective different locations of an inactive link.

In order to be able to do this, one has to block all east going and all west going reused wavelengths in each node. This can be done by arranging simple in-line blocking filters. Then there is a possibility to arrange the wavelength allocation such that these blocking filters can have a simple construction, see the block diagram of an add and drop node suited for traffic between only adjacent nodes in FIG. 3. In FIGS. 3 and 2 the same reference signs are used for identical or corresponding elements. One possibility of designing such blocking filters may be to arrange e.g. the lower half of the total wavelength window for the east going channels and the upper half of the window for the west going channels with a guard space between the bands, i.e. in the example that all the wavelengths $\lambda_1$, $\lambda_2$, $\lambda_3$ are smaller (or greater) than all of the wavelengths $\lambda_4$, $\lambda_5$, $\lambda_6$. Then e.g. single bandblocking filters or even lowpass and highpass filters can be used as bandblocking filters for each direction.

A node can then be divided into a west port and an east port, each port having suitable switches not connected in-line for allowing a change of direction of some of the wavelength channels when the node is changed from being an inner node to an east-most or west-most mode, directly connected to the inactive link. The receivers are then divided in east port receivers 11w for receiving from the eastern direction, i.e. from the adjacent node located at the east side of the node, and west port receivers 11e for receiving from the western direction, i.e. from the adjacent node located at the west side of the node, the directions being indicated for the node being assumed not to be the west-most or east-most node, i.e. not a node directly connected to the inactive link 2. For the west-most node the west port receivers 11e are instead used for receiving from the east-most node and for the east-most node the east port receivers 11w are used for receiving from the west-most node by changing the setting of switches, as will be described hereinafter, see also FIGS. 5a and 5b. In the same way, the transmitters are divided in east port transmiters 13e for transmitting in the eastern direction, to the adjacent node located at the east side of the considered node, and west port transmitters 13w for transmitting in the western direction, to the adjacent node located at the east side of the node, the directions being also indicated for the case where the considered node is connected to be an inner node, not directly connected to the inactive link 2. For the west-most node the west port transmitters 13w are also used for transmitting to the east-most node and for the east-most node the east port transmitters 13e are also used for transmitting to the west-most node.

Since it is not necessary to be able to switch on a channel by channel basis in the node of FIG. 3, it is sufficient to arrange one switch element for each group of receivers 11e, 11w and each group of transmitters 13e, 13w, instead of one switch for each received channel and each transmitted channel in the node, as proposed in the already cited, simultaneously filed U.S. patent application "An optical WDM network having an efficient use of wavelengths and a node therefor".

Thus, in both directions in the middle of the node illustrated in FIG. 3, simple blocking filters 3le, 3lw are inserted between that output of the drop coupler 17e', 17w' carrying the signal to be forwarded through the node and an input of the respective add coupler 23e', 23w'. The drop couplers 17e', 17w' are similar to the drop couplers 17e, 17w of FIG. 2 but tap off, from the light power passing in each direction, two substantially equal shares of power, each drop coupler 17e', 17w' thus having three output terminals or lines. The light signal incoming to the node in each direction includes all wavelengths $\lambda_1, \lambda_2, \ldots, \lambda_6$ used in the system, according to the example of FIGS. 5a and 5b. For an inner node half the number of wavelengths are terminated in the node for each direction, so that for the example of FIGS. 5a and 5b the wavelengths $\lambda_4, \lambda_5, \lambda_6$ in the east-going direction are terminated and the wavelengths $\lambda_1, \lambda_2, \lambda_3$ in the west-going direction are terminated in an inner node. A wavelength channel is said to be terminated in a node if it is received in the node, i.e. if there is a receiver 11e, 11w for this channel in the node.

Each of the blocking filters 3le, 3lw in the considered node blocks only those wavelengths $\lambda_4, \lambda_5, \lambda_6$ and $\lambda_1, \lambda_2, \lambda_3$ respectively which are terminated in the node for the respective direction, where it is supposed that the node is connected as an inner node or not as an end node connected to the inactive link. All wavelengths not included in the set [$\lambda_4$, $\lambda_5, \lambda_6$] are then just passed through the node in the east going direction in a basically unaffected or uninterrupted way and in the same way all wavelengths not included in the set [$\lambda_1, \lambda_2, \lambda_3$] are just passed through the node in the west going direction in a basically uninterrupted way, where it is again supposed that the node is connected as an inner node.

Like the node according to FIG. 2 the optional preamplifiers 15e, 15w each have their outputs connected to a respective drop coupler 17e', 17w'. The drop couplers couple the two, preferably equal, deflected shares of the power of the received light to 2:1 switching elements 33e, 33w, so that each such switching element receives on its two inputs a share of the light power propagating in the two opposite directions. Such a 2:1 switching element 33e, 33w has its single output terminal connected to the input of a respective demultiplexer 35e, 35w and each of its input terminals is thus connected to a separate one of the drop couplers 17e', 17w'. The demultiplexers or filter blocks 35e, 35w correspond to the filter block 21 of FIG. 2 and perform the necessary demultiplexing or bandpass filtering for the wavelength channels to be received in the receivers 11e, 11w, the light receivers or light detectors used in the conventional way for detecting only the power of the received light. Thus one filter block 35e contains bandpass filters for each of the wavelengths $\lambda_4, \lambda_5, \lambda_6$, which correspond to channels in the east going direction and are terminated in the node, and another filter block 35w contains bandpass filters for each of the wavelengths $\lambda_1, \lambda_2, \lambda_3$, which correspond to channels in the west going direction and are terminated in the node, the directions being indicated for the case where the node is an inner node. The output of each of the filters in such filter block 35e, 35w, which thus carries a light signal of a specific wavelength or of a specific narrow wavelength interval, is connected to a respective receiver 11e, 11w.

Each transmitter 13e, 13w has its output terminal directly connected to one of two multiplexer blocks 37e, 37w, these multiplexers corresponding to the multiplexer 25 of FIG. 2, one multiplexer block 37e being arranged for traffic in the east direction and one multiplexer block 37w for traffic in the west direction, the directions being again indicated for the case where the node is connected to be an inner node. A 1:2 switching element 39e, 39w has its single input terminal directly connected to the output of a respective multiplexer 37e, 37w and each of its output terminals is connected to one of die add couplers 23e', 23w' for adding the transmitted combination of wavelength channels in the respective direction, depending on the position of the switching element. The add couplers 23e', 23w' which correspond to the add coupler 23e, 23w of FIG. 2 thus here add two signals to the traffic passing through the node and has three inputs.

If in the node of FIG. 3 a wavelength channel is received from one direction and then also blocked in the node in this direction, the same wavelength channel must be able to propagate through the node on the other fiber in the opposite direction without being blocked in the node, see FIGS. 5a and 5b. In FIG. 3 the positions of the switching elements 33e, 33w and 39e, 39w are illustrated for a node not connected as an end node, i.e. in the case in which it is not connected at one of its sides to the inactive link. If the bus has to flex owing to some failure and the node then becomes connected directly to the inactive link, one of the receiver switching elements 33e, 33w then has to change its position and that one of the switching elements 39e, 39w connected through a multiplexer 37e, 37w to transmitters 13e, 13w which is located in the same side or port of the node also has to change its position, i.e. when a receiver switching element receiving from traffic going in a first direction has to change also that transmitter switching element has to change which transmits in a direction opposite to the first direction. The receiver and transmitter switching elements 33e, 39w and 33w, 39e for changing the paths for a correct connection with another node, i.e. for receiving from and transmitting correctly to the other node, can thus be linked to the same triggering point, indicated as "CP" in FIG. 3, simplifying the procedure which must be executed by some control unit, not shown, arranged to control the position of the switching elements to allow the bus to "flex". It can be observed that the wavelengths blocked by the blocking filters 3le, 3lw in each direction do not have to be changed for a flexing situation.

Thus in particular, the west port switching elements 33e, 39w for the west port demultiplexer 35e and the west port multiplexer 37w are to be in the west position, as shown in FIG. 3, unless the considered node is the west-most node of the bus, whereas the east port switching elements 33w, 39e should be in the east position illustrated in FIG. 3, unless the considered node is the east-most node of the bus.

For reliability reasons it may be advantageous to replace all switching elements by a unit 41 combined of a 1:2 coupler 43 and a simple on/off-switch 45, as illustrated in FIG. 4. The on/off-switch 45 is arranged in the branch which is most likely to be open, these positions appearing from FIG. 3, and is open in all nodes except in the west-most and east-most nodes where it is closed in two switching elements. The link which is to be deactivated can be made inactive by always letting the west port amplifiers 15e, 29w in the new west-most node block all signals coming from and going to the west and in that node also the on/off-switches in the west port are then closed. In the corresponding way, in the new east-most node always the east port amplifiers 15w, 29e can be made to block all signals coming from and going to the east and in that node also the on/off-switches included in the switching elements in the east port are closed.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claim are intended to cover all such modifications and changes as fall within a true spirit and scope of the invention.

What is claimed is:

1. A node arranged to be connected in a network and for communication only with adjacent nodes, the network including a ring configuration including two optical fibers each carrying light signals in one direction, the direction being opposite each other and links connecting adjacent nodes, an inactive link carrying no light signals such that when the inactive link is made active another one of the links is made inactive, and the network carrying the light signals in a plurality of wavelength bands separate from each other, the node comprising:

a drop coupler and an add coupler for each of the opposite directions for taking out a share of the light signals at the node and adding light signals in the node to the light signals carried in the network, respectively;

plural receivers for receiving light signals in wavelength bands in the node and transmitters for transmitting light signals in wavelength bands from the node into the network;

a band blocking filter arranged between the drop coupler and the add coupler for each of the opposite directions for blocking in the respective opposite direction light of all wavelengths in the wavelength bands of light signals which are received by the receivers in the node from the respective direction; and at least one of:

a 2x1 switch coupled between the drop couplers and at least one of the receivers for allowing the at least one of the receivers to receive from either one of the opposite directions, and a 1x2 switch coupled between at least one of the transmitters and the add couplers for allowing the at least one of the transmitters to transmit in either one of the opposite directions.

2. The node of claim 1, wherein the receivers are divided in two groups, a first group of west port receivers and a second group of east port receivers, a 2x1 switch being coupled to all the receivers of one of the groups for allowing all the receivers of said one of the groups to simultaneously receive from either one of the opposite directions.

3. The node of claim 2, further comprising an optical demultiplexer coupled between the 2x1 switch and said one of the groups of receivers.

4. The node of claim 1, wherein the transmitters are divided in two groups, a first group of a plurality of west port transmitters and a second group of a plurality of east port transmitters, a 1x2 witch being coupled to all the transmitters of one of the groups for allowing all the transmitters of said one of the groups to simultaneously transmit in either one of the opposite directions.

5. Then node of claim 4, further comprising an optical multiplexer coupled between the 1x2 switch and said one group of the transmitters.

* * * * *